Nov. 29, 1955  H. F. BREMER  2,725,458
THERMOSTATICALLY-CONTROLLED ELECTRICAL WATER HEATER
Filed May 10, 1954  4 Sheets-Sheet 1

INVENTOR.
HERMANN F. BREMER
BY
Kenyon & Kenyon
ATTORNEYS

Nov. 29, 1955     H. F. BREMER     2,725,458
THERMOSTATICALLY-CONTROLLED ELECTRICAL WATER HEATER
Filed May 10, 1954     4 Sheets-Sheet 2

*INVENTOR.*
HERMANN F. BREMER
BY
Kenyon & Kenyon
ATTORNEYS

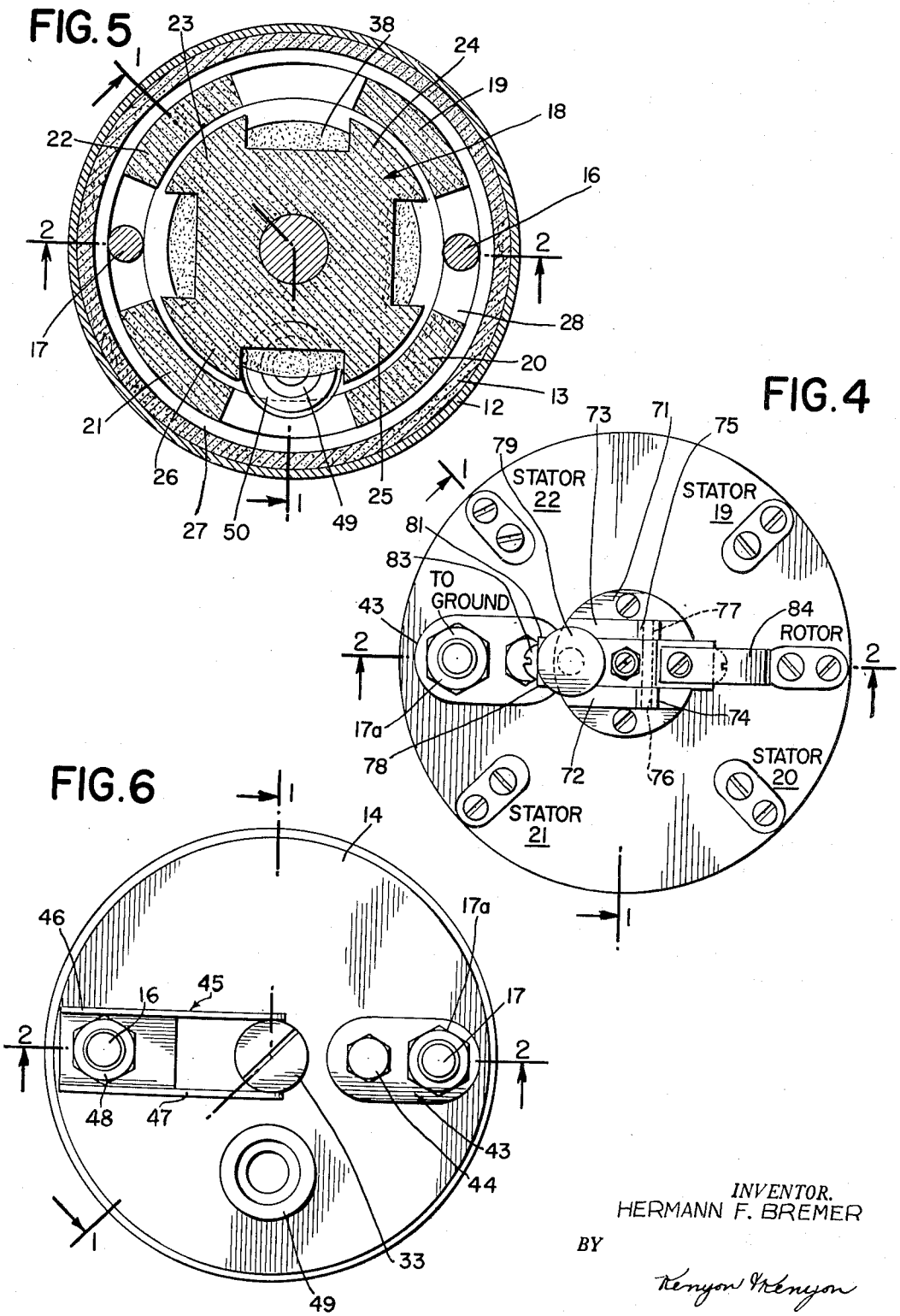

Nov. 29, 1955

H. F. BREMER 2,725,458

THERMOSTATICALLY-CONTROLLED ELECTRICAL WATER HEATER

Filed May 10, 1954

INVENTOR.
HERMANN F. BREMER
BY
Kenyon & Kenyon
ATTORNEYS

United States Patent Office 2,725,458
Patented Nov. 29, 1955

2,725,458

THERMOSTATICALLY-CONTROLLED ELECTRICAL WATER HEATER

Hermann F. Bremer, Mayagues, Puerto Rico, assignor to Indevco, Inc., Bronx, N. Y., a corporation of New York Application May 10, 1954, Serial No. 428,450

13 Claims. (Cl. 219—40)

The present invention relates generally to the electrical heating of liquids and in particular to improvements in thermostatically-controlled electrical water heaters.

In electrical water heaters of the type wherein heating is effected by the conduction of an electrical current through a passage formed between oppositely-poled carbon electrodes, the need exists for means to maintain water temperature at a predetermined level, irrespective of the rate of water flow. In the absence of temperature control means, for a given voltage supply the temperature level to which the water will be raised will depend on the extent to which the heater outlet valve is opened to govern the rate of hot water flow. Consequently, with the valve completely open, the water temperature will be substantially less than that attained with the valve half open.

Where a conventional electrical water heater is used in conjunction with a standard thermostat for controlling water temperature, experience has shown that the intermittently-actuated contacts of the thermostat undergo rapid deterioration due to the heavy current densities and the resultant arcing when the contacts are disengaged. Another disadvantage encountered with standard thermostats of the type wherein a switch is actuated by the rise and fall of a temperature-responsive mercury column is the existence of an air-pocket between the mercury column and the switch actuator. It has been found that the air-pocket, by reason of its compressibility, prevents a positive switching action, as a consequence of which the operation of the thermostat is irregular and unreliable.

Accordingly, it is the principal object of the invention to provide an improved thermostatically-controlled electrical heater having a positive control action and in which arcing is minimized.

More particularly, it is an object of the invention to provide a heater of the above-described type wherein only a portion of the current flowing through the heater is controlled by the thermostat. In accordance with one feature of the invention, one of the electrodes of the heater is constituted by a plurality of sections, the voltage to some of the sections being impressed through the contacts of a thermostat while the remaining sections are coupled directly to the voltage supply.

Still another object of the invention is to provide a positive-acting thermostat, including a mercury column and a piston switch actuator, said piston having a structure adapted to preclude the existence of an air-pocket.

It is yet another object of the invention to provide a thermostatically-controlled electrical heater of compact and rugged construction and of efficient mechanical and electrical design.

For a better understanding of the invention as well as other objects and further features thereof, reference is made to the following detailed description of one illustrative form of apparatus embodying the invention, which said description is to be read in conjunction with the annexed drawing wherein corresponding parts in the several views are identified by like reference numerals.

In the drawing:

Fig. 4 is a bottom plan view of the apparatus.

Fig. 5 is a horizontal section taken in the plane 5—5 of Fig. 2.

Fig. 6 is a top plan view of the apparatus.

Figure 1:
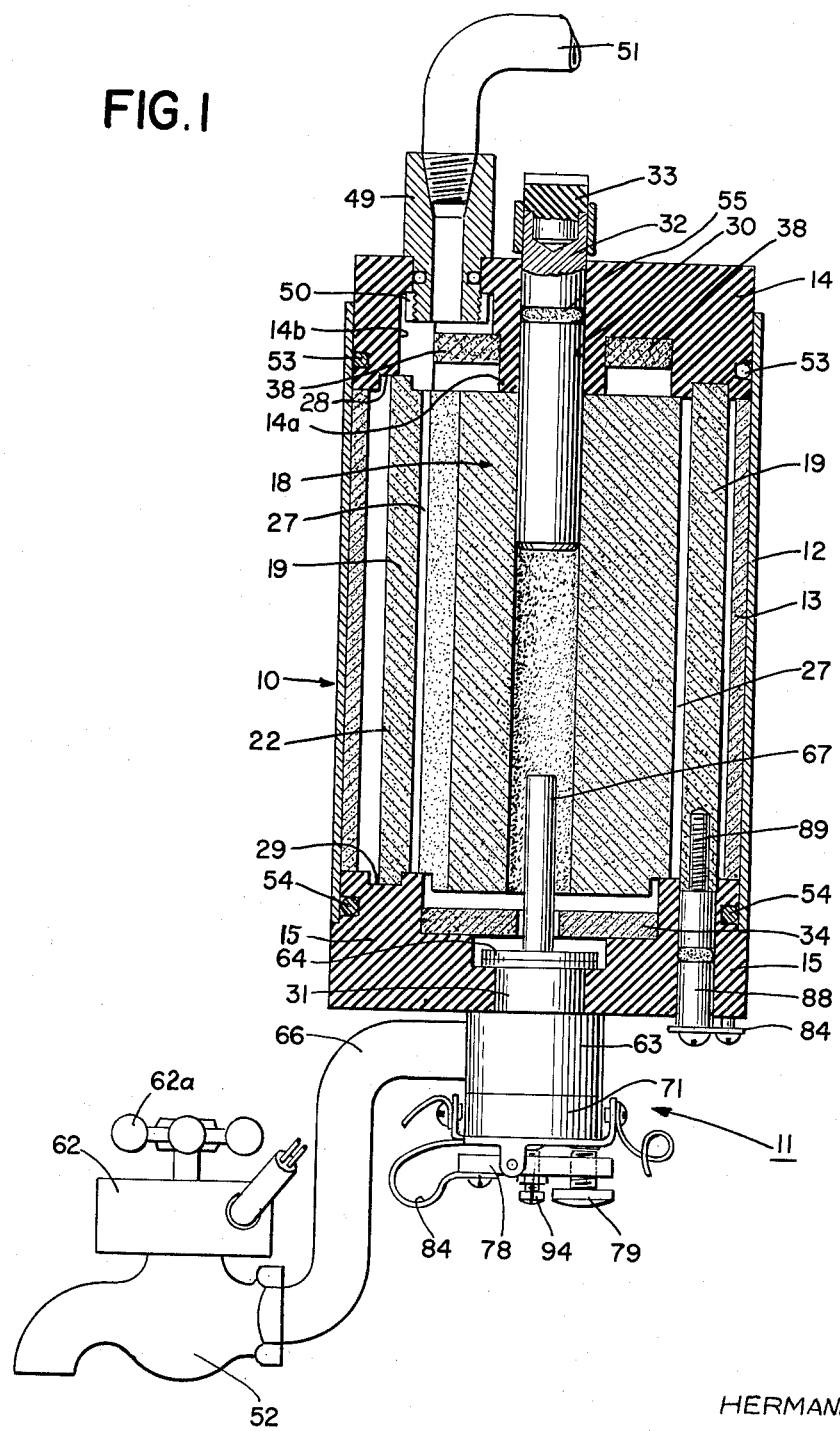
Fig. 1 is an elevational view of a thermostatically-controlled electrical water-heating apparatus, in accordance with the invention, the heater assembly being shown in vertical section taken in the plane 1—1 of Fig. 4.
Figure 2:
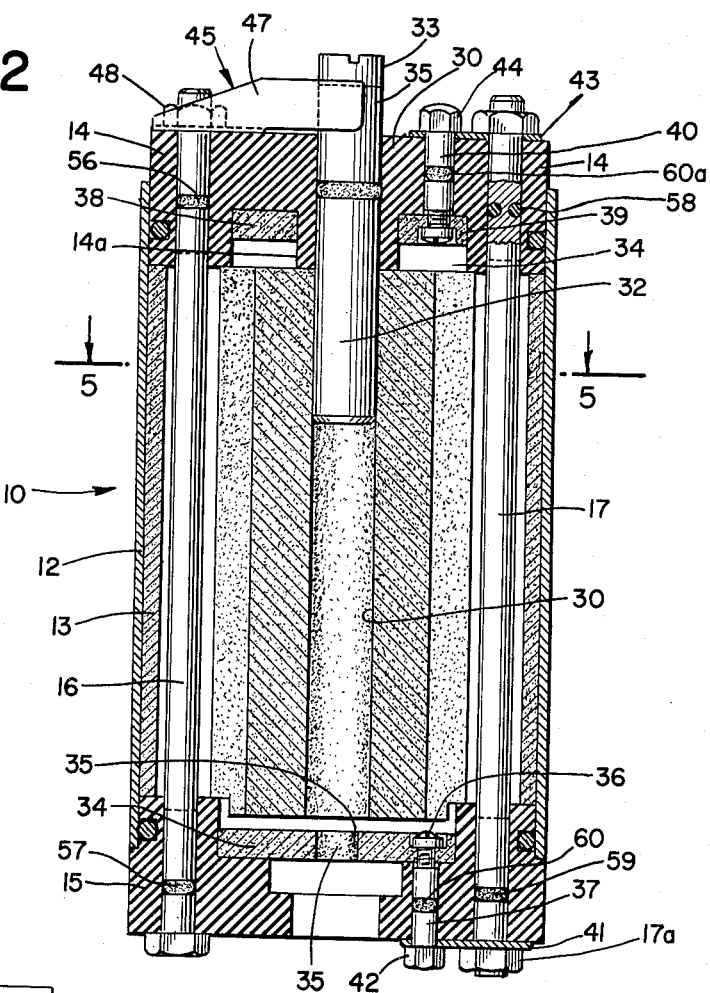
Fig. 2 is a similar section taken in the plane 2—2 of Fig. 4, the thermostat being removed from the heater.

Referring now to the drawing and more particularly to Fig. 1, the thermostatically-controlled electrical water-heating apparatus, in accordance with the invention, is generally constituted by a heater assembly 10 and a thermostat 11 associated therewith. These elements will be described in the order named.

The electrical heater assembly

The heater assembly 10 comprises a water-heating chamber formed by an open-ended outer casing 12 made of a suitable metal, such as copper, and a cylindrical inner shell 13 preferably made of graphite or carbon. The ends of the shell and casing are enclosed by insulating discs 14 and 15, formed of Bakelite or of material having similar properties. The inner face of disc 14 has formed centrally thereon a boss 14a. The heater assembly is rigidly held together by a pair of tie-rods 16 and 17, whose threaded ends extend through suitable openings in discs 14 and 15.

As best seen in Fig. 5, concentrically-disposed within the heater chamber is an electrode structure constituted by a unitary rotor electrode element 18 and a segmental stator electrode defined by stator sections 19, 20, 21 and 22. The rotor electrode element 18 is preferably machined from a cylindrical block of solid carbon or graphite having an axial bore, longitudinal channels being cut therein to produce four symmetrically-arranged pole pieces 23, 24, 25 and 26. The stator sections 19, 20, 21 and 22, which complement said pole pieces, are arranged circumferentially at equi-spaced positions about rotor electrode element 18 and are spaced therefrom to define an annular water passage 27.

The stator sections are formed of carbon or graphite strips and, as is evident from Fig. 5, have an arcuate cross-section whose curvature corresponds to that of the faces of the pole pieces. The extremities of stator sections 19, 20, 21 and 22 are secured within circular slots 28 and 29 in discs 14 and 15, respectively. Thus, rotation of rotor element 18 will vary the angular position of the pole pieces 23 to 26 with respect to stator sections 19 to 22 from a point at which they are exactly in register to a point at which they are altogether out of register.

Discs 14 and 15 are centrally provided with bores 30 and 31, respectively, disposed in axial alignment, bore 31 serving as the outlet of the heating chamber. The rotor electrode element 18 is rotatably mounted on a metal shaft 32. The shaft passes through bore 30 in disc 14 and projects without the heater assembly to terminate in an adjusting screw-head 33, which head facilitates the use of a screwdriver to adjust the angular position of the rotor element. The upper end of rotor element 18 rests upon the face of boss 14a.

Positioned within a recess in disc 15 is a circular grounding-plate 34 having a central opening 35 in axial alignment with bore 31 in disc 15. Grounding-plate 34 is held in place by means of a single screw 36 received in an internally-threaded sleeve 37, the sleeve fitting snugly into a suitable aperture extending through disc 15. Similarly positioned within a recess in disc 14 is a circular grounding-plate 33 having a central opening to accommodate boss 14a. Plate 33 is held in place by a single screw 39 received in an internally-threaded metal sleeve 40 inserted in a suitable aperture in disc 14. Grounding-plates 34 and 33 are both fabricated of the same material as that of the electrode structure.

The lower end of tie-rod 17 is electrically connected to grounding-plate 34 with the aid of a flat metal link 41, the link being secured and electrically connected to the lower end of sleeve 37 by means of a bolt 42. In a similar manner, the upper end of tie-rod 17 is electrically connected to grounding-plate 33 via a flat metal link 43, the link being secured to the upper end of sleeve 40 by means of a bolt 44. The lower end of tie-rod 17 is employed as a terminal for connection to a point of ground potential, the connecting lead being attached or soldered to the nut 17a, whereby the grounding-plates 34 and 33 may both be held at ground potential. Electrical connection to the rotor electrode element 18 is effected via a metallic brush 45 having a pair of parallel resilient extensions 46 and 47 which frictionally engage opposing surfaces on shaft 32. Brush 45 is secured and electrically-connected to the upper end of tie-rod 16 by means of a bolt 48.

An inlet coupling 49 for the heater chamber is provided, the coupling extending through an off-center opening in disc 14 and being secured thereto by a nut 50. Coupling 49 is internally-threaded for connection with the aid of a suitable hose 51 to a water supply. To permit passage of the unheated water entering inlet coupling 49 into the heating chamber, the inner wall of disc 14 is provided with a notch 14b affording clearance between the edge of plate 38 and the inner wall of disc 14.

To render the water-heating chamber fluid-tight, O rings formed of elastic material, such as rubber, are provided, the rings being placed within suitable circumferential channels formed in the associated elements. Thus, disc 14 is provided with an O ring 53 effecting a water seal between disc 14 and outer casing 12, and disc 15 is provided with a ring 54 effecting a similar seal. A water seal between shaft 32 and disc 14 is obtained by means of an O ring 55. Tie-rod 16 is provided at either end thereof with O rings 56 and 57, and tie-rod 17 is likewise provided with rings 58 and 59. Sleeves 37 and 40 are furnished with O rings 60 and 60a, respectively. A water-tight heating chamber is thereby insured.

Thus, water entering the heating chamber via inlet pipe 51 will first make contact with grounding-plate 38 before passing through notch 14b to flow down the annular passage 27 between the rotor electrode element 18 and the stator sections 19 to 22 to be heated. The heated water thereupon makes contact with grounding-plate 34 before emerging from outlet bore 31.

*The thermostat*

Figure 7:
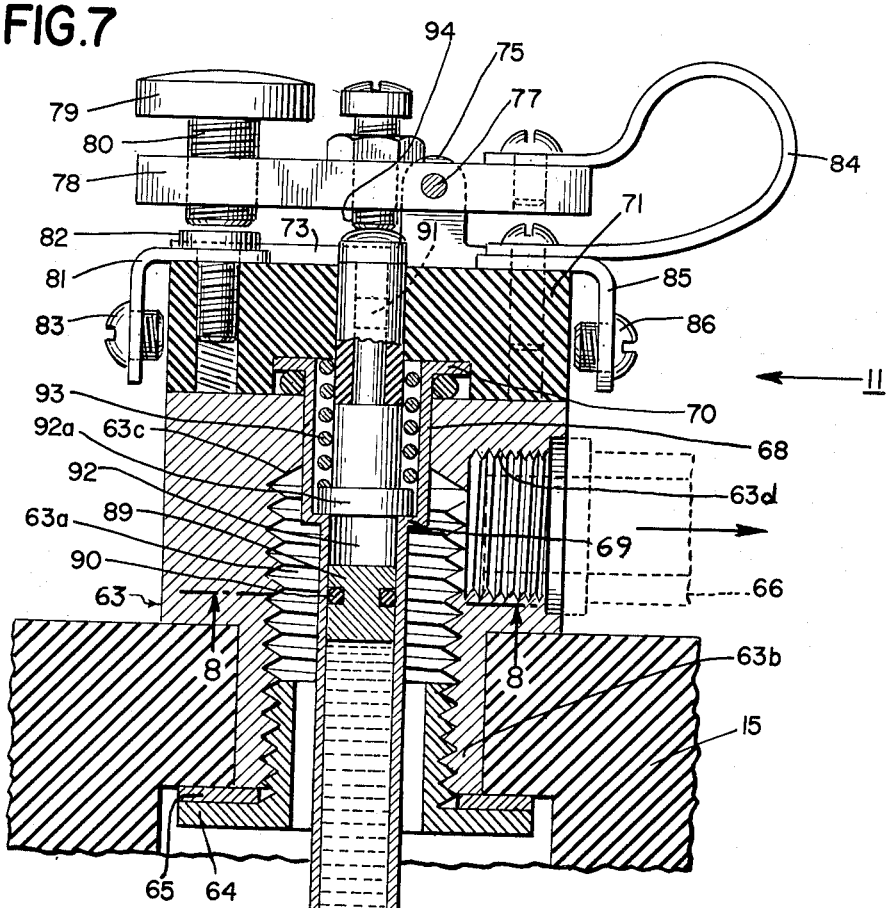
Fig. 7 is an enlarged vertical section of the thermostat shown in Fig. 1.
Figure 8:
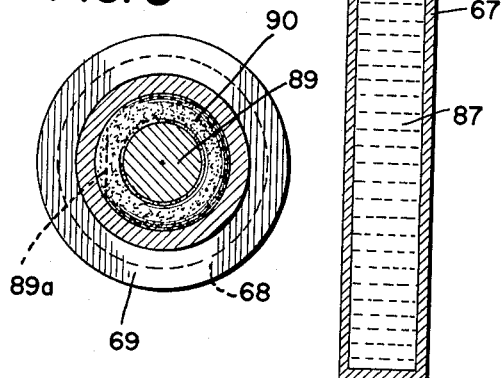
Fig. 8 is a horizontal section taken through the plane 8—8 in Fig. 7.
Figure 9:
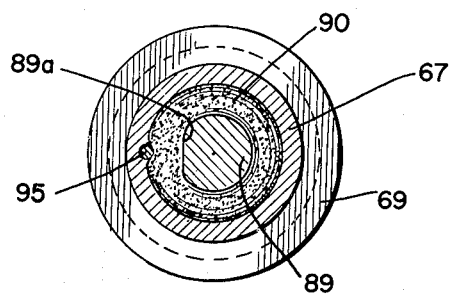
Fig. 9 is identical with Fig. 8, save that it further illustrates the position of a probe inserted into the device to facilitate removal of an air-pocket therein.

Referring now to Figs. 7 to 9, thermostat 11, to facilitate examination thereof, is shown in a position reversed from that it normally occupies below the heater 10.

The thermostat in accordance with the invention includes a hollow cylindrical seat 63, having a longitudinal bore 63a and an internally threaded projection 63b. When the apparatus is assembled projection 63b is inserted in the inlet 31 of heater 10, whereby the seat rests upon the outer face of disc 15. Thermostat 11 is firmly attached to the heater assembly by means of bushing 64 having an annular flange. The bushing 64 is threadably received within projection 63b, a washer 65 being interposed between the flange and the inner wall of disc 15.

The upper end of seat 63 has formed thereon a circular lip 63c constricting somewhat the opening to bore 63a. A water outlet pipe 66 is coupled to seat 63 and communicates with bore 63a therein via a lateral passage 63d. Outlet pipe 66 terminates in a water control spigot 52 which is further provided with a normally open electrical power switch 62 operated by spigot handle 62a, so that even when the spigot is but slightly opened the switch is actuated and remains actuated as the spigot is further opened. Switch 62 is cut off only when the spigot is completely closed. It is to be understood that while switch 62 has been shown in a form directly mounted on spigot 52, it may be separated therefrom with mechanical linkage means provided between the spigot handle and the switch.

Coaxially disposed within seat 63 is an elongated tube 67 whose lower end is enclosed and whose upper section 68 is of enlarged diameter to define a shoulder 69. The mouth of section 68 has a flange 70 formed thereabout which rests on lip 63c of the seat to hold the tube in place. As best seen in Fig. 1, when the apparatus is assembled, tube 67 passes through the opening in grounding-plate 34 into the central bore in rotor electrode 18. Thus heated water emerging from the heater 10 flows through the thermostat in the annular passage formed between the inner wall of seat 63 and tube 67, the heat of the water being transmitted to the mercury column.

Contiguous with seat 63 and secured thereto by suitable screws in an insulating disc 71. Disc 71 has formed thereon two parallel ribs 72 and 73 provided with vertical lugs 74 and 75, respectively. Pivotally supported by trunnions 76 and 77 is a metal armature 78 which carries at one end thereof at the tip of an adjusting screw 79, a movable contact 80. On a metal strip 81 positioned between ribs 72 and 73 there is mounted a fixed contact 82 in coacting relation with contact 80, the strip having a lateral extension supporting a screw 83 providing a terminal for the fixed contact. The movable contact 80 is biased to engage fixed contact 82 by means of a flat metal spring 84 attached at one end to armature 78 and at the other to a metal strip 85 secured between ribs 72 and 73 and having a lateral extension supporting a screw 86 serving as a terminal for the movable contact 80.

Tube 67 is filled with a column 87 of mercury. Slidably received within tube 67 and floating above the mercury column is a generally cylindrical piston 89 having a circumferential groove into which is fitted a compressible O ring 90 made of rubber or similar material to prevent leakage of the mercury from the tube. As best seen in Fig. 9, a longitudinal segment 89a of the cylindrical piston is flattened to form an air leakage channel extending from the upper surface of the mercury column 87 to the air space above the piston. The expansion of the ring 90, however, normally blocks the channel and prevents leakage therethrough.

When first inserting the piston 89 in tube 67 so that it makes contact with the mercury column we are faced with the problem of providing a leakage path for the air, otherwise an air-pocket will be formed between the surface of the mercury and the underface of the piston. This air leakage path is temporarily provided, as shown in Fig. 9, by injecting a small pin or probe 95 between the wall of tube 67 and O ring 90 to deform the ring so as to press against the flattened portion 89a and thereby unblock the air leakage channel. With the leakage channel thus cleared, the piston 89 is forced downwardly until it meets the surface of the mercury, the pin 95 then being withdrawn. It will be found that in withdrawing the pin a small drop of mercury will adhere thereto indicating an air free contact between the piston and the mercury. Ring 90 will, upon withdrawal of the pin, resume its initial shape to seal off the leakage path.

In operation, the position occupied by the piston 89 in the tube 67 will depend on the height of mercury column 87 therein, which in turn is contingent on the temperature of the water in the heater. The piston movement is transmitted to armature 78 by means of a rod 91 which passes through a central opening in disc 71 and terminates in a shoe 92 in abutting relation with piston 89. Shoe 92 is provided with a flange portion 92a which on the downward stroke of 91 engages shoulder 69 to limit the movement thereof. A helical expansion spring 93 surrounds rod 91 and is interposed between flange 92a and the underside of disc 71 to urge shoe 92 to bear against piston 89 in a direction opposed to the pressure of the expanding mercury column. The upper end of rod 91 makes contact with a set screw 94 attached to armature 78.

Thus as piston 89 is forced upwardly by the rise of the mercury column 87 with an increase in temperature, this movement is transmitted by rod 91 to the armature 78 so as to disengage contacts 80 and 82. And as the mercury column 87 falls with a drop in water temperature, the armature is permitted to pivot downwardly to effect engagement of the contacts 80 and 82.

The electrical circuit

Figure 3:
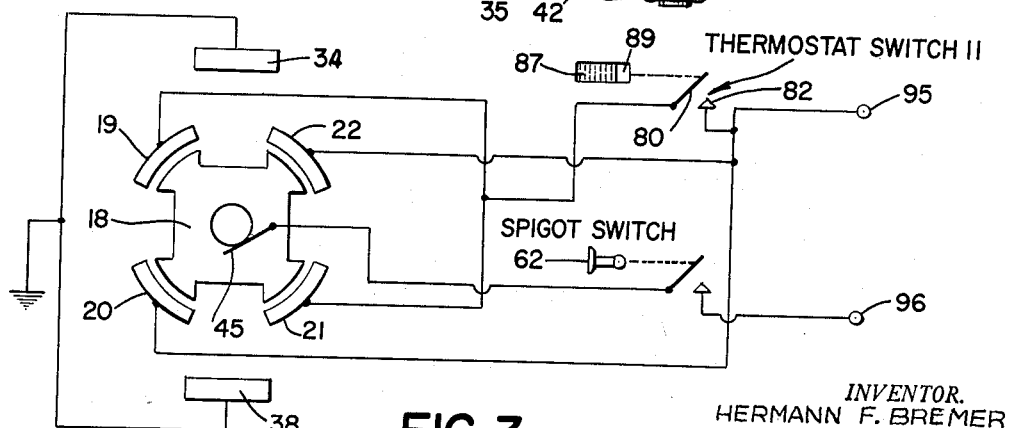
Fig. 3 is a schematic circuit diagram of the thermostatically-controlled heating apparatus, when connected in an operating circuit.

As illustrated in Fig. 3, the operating circuit comprises a potential source which may be an alternating or a direct-current supply connected to terminals 95 and 96. Terminal 95 is connected directly to stator sections 20 and 22 and via the contacts 80 and 82 of thermostatic switch 11 to stator sections 19 and 21. Terminal 96 is connected via spigot switch 62 and brush 45 to rotor electrode 18. The grounding-plates 34 and 38 are connected directly to ground.

Thus when the spigot is opened, switch 62 which is actuated by the handle 62a is closed, whereby the voltage circuit is completed between rotor 18 and stators 20 and 22, thereby developing a potential difference therebetween effecting heating of the water. Should the water temperature fall below a predetermined level, thermostatic switch 11 will be actuated to complete the circuit with respect to remaining stator sections 19 and 21 to increase the conduction current through the water. In the event the water temperature rises above said predetermined level, the thermostatic switch will be disengaged. Thus thermostatic switch 11 acts intermittently to maintain a desired water temperature. Inasmuch as only half the total current drawn by the heater passes through the contacts of the switch 11, arcing effects are minimized. Spigot switch 62, which in some conditions will carry the full heater current resulting from the connection of all the stator sections, and in other conditions will carry but half the current, is less frequently operated, hence arcing effects with respect to this switch are not serious.

General operation

When spigot 52 is opened, unheated water supplied through inlet pipe 51 enters the heater assembly 10 and flows into channel 27 between rotor electrode 18 and stator sections 19 to 22 to be heated by electrical conduction, the water then passing into thermostat 11 and emerging therefrom through outlet pipe 66.

Opening of spigot 52 also actuates switch 62 so that heating of the water follows shortly thereafter, and as the water temperature tends to rise and fall depending on the rate of water flow as controlled by spigot 52, the thermostat 11 acts to maintain the temperature at the desired level.

To adapt the heater apparatus for use in regions in which the water supply differs materially in salt content and hence in resistivity, one has merely to adjust, by means of a screwdriver, the angular position of the rotor element 18 relative to the stator sections.

While there has been shown what at present is considered to be a preferred embodiment of the invention, it is to be understood that many changes and modifications may be made therein without departing from the essential spirit of the invention as set forth in the annexed claims.

What is claimed is:

1. Apparatus for heating fluid by electrical conduction comprising a heater assembly provided with a primary electrode and a plurality of secondary electrodes, a water passage being formed between said primary electrode and each of said secondary electrodes; a thermostatic device including a thermally-responsive element coupled to the water passage in said heater, a switch actuated by said element in response to changes in the temperature of water in said passage, and a voltage supply having one terminal connected to said primary electrode and another terminal connected directly to at least one of said secondary electrodes and in series with said switch to at least one other of said secondary electrodes so that responsive actuation of said switch as aforesaid will automatically provide variations in heating current through the fluid by automatic connection and disconnection through said switch of the last-named of the secondary electrodes with the last-named terminal.

2. Apparatus for heating water by electrical conduction comprising a heater assembly including a heating chamber, a rotor electrode disposed within said chamber and having a plurality of symmetrically arranged pole pieces, and a like plurality of complementary stator electrode sections disposed circumferentially about said rotor electrode and spaced therefrom to define an annular water passage in said chamber; a thermostatic device including a thermally-responsive element extending into said heating chamber, a switch actuated by said element in response to change in the water temperature in said chamber; first and second voltage supply terminals, means connecting one of said terminals to said rotor electrode, and means connecting the other of said terminals through said switch to at least one of said sections and directly to at least one other of said sections so that responsive actuation of said switch as aforesaid will automatically provide variations in heating current through the water in said chamber by automatic connection and disconnection through said switch of said last-named section with the last-named terminal.

3. Apparatus for heating water by electrical conduction comprising a heater assembly including a heating chamber, a rotor electrode disposed within said chamber and having a plurality of symmetrically arranged pole pieces, and a like plurality of complementary stator electrode sections disposed circumferentially about said rotor electrode and spaced therefrom to define an annular water passage in said chamber; a thermostatic device including a thermally-responsive element extending into said heating chamber, a switch actuated by said element in response to change in the water temperature in said chamber, first and second voltage supply terminals, means connecting one of said terminals to said rotor electrode, means connecting the other of said terminals through said switch to at least one of said sections and directly to at least one other of said sections so that responsive actuation of said switch as aforesaid will automatically provide variations in heating current through the water in said chamber by automatic connection and disconnection through said switch of said last-named section with the last-named terminal; an outlet spigot coupled to said heating chamber; a second normally-open switch operatively coupled to said spigot whereby said second switch is rendered operative when said spigot is opened, and means interposing said second switch between said rotor electrode and said first-mentioned terminal.

4. In an apparatus for heating water by electrical conduction, the combination of a heater assembly including a heating chamber, a cylindrical rotor electrode disposed in said chamber and having a central bore, said chamber having an outlet in alignment with said bore, a thermostatic device mounted on said heater assembly and including an elongated tube containing a mercury column, said tube extending through said outlet into said rotor electrode bore, an electrical switch, and a piston actuator slidable in said tube and operatively coupled to said switch.

5. Apparatus for heating water by electrical conduction comprising a heater assembly including a heating chamber, a cylindrical rotor electrode disposed in said chamber and having a central bore, a plurality of stator electrodes circumferentially surrounding said rotor electrode and spaced therefrom to form a water passage, said chamber having an outlet in alignment with said central bore; a thermostatic device mounted on said assembly and including an elongated tube containing a mercury column and extending through said outlet into said rotor electrode bore; a switch; a piston actuator slidable in said tube and operatively coupled to said switch; and circuit means connecting said rotor electrode to one terminal of a voltage supply and some of said stator electrodes to the other terminal thereof through said switch, the remaining stator electrodes being directly connected to said other terminal.

6. In an electrical water heating apparatus, the combination of a heater assembly including an open-ended cylindrical outer casing, an inner shell disposed within said casing, first and second insulating discs enclosing the ends of said casing to define a heating chamber, an electrode structure disposed concentrically within said chamber and having a cylindrical rotor electrode having an axial bore and formed with a plurality of symmetrically arranged poles and a like plurality of complementary stator sections circumferentially arranged about said rotor electrode in spaced relation thereto to form an annular water passage, a shaft supporting said rotor electrode and extending through said first disc to the exterior of the chamber to facilitate adjustment of said rotor electrode, said first disc having an inlet opening, said second disc having an outlet opening in alignment with said axial bore; a thermostatic device supported on said second disc and having a hollow seat provided with a projection extending into said outlet, a tube containing mercury supported concentrically within said seat and extending through said inlet into said axial bore and a piston actuator slidable with said tube to assume a position depending on the height of said mercury and operatively coupled to said switch.

7. Apparatus as set forth in claim 6, further including a spigot coupled to the outlet of said chamber, a second normally-open switch operatively coupled to said spigot whereby said second switch is closed though when said spigot is opened, circuit means to apply through said second switch a potential difference between said rotor electrode and said stator sections, and means interposing said thermostatic switch in the circuit of some of said stator sections.

8. In a thermostatic switch, a tube containing a mercury column, a generally cylindrical piston slidably received within said tube and having a circumferential groove, and an elastic ring providing a seal between the inner wall of said tube and said piston, said piston having a flattened portion forming a leakage channel between said mercury column at the underside of said piston and the air space thereabove, said ring normally blocking said channel and being deformable to open said channel.

9. In a thermostatic switch, a hollow seat member, a tube containing a mercury column concentrically mounted within said member, a generally cylindrical piston slidably received within said tube and having a circumferential groove, and an elastic ring fitted within said groove to provide a seal between the inner wall of said tube and said piston, a longitudinal portion of said piston being flattened to form an air-leakage channel.

10. In a thermostatic switch, a hollow cylindrical seat, an elongated tube containing mercury coaxially mounted within said seat, a generally cylindrical piston slidably received within said tube and having a circumferential groove, and an elastic ring fitted within said groove, a portion of said piston being flattened to form a longitudinal air-leakage channel, an electrical switch mounted above said seat and including a pivoted armature, and a rod having one end abutting said piston and the other end thereof engaging said armature to transmit the movement of said piston thereto.

11. In a thermostatic switch, a hollow cylindrical seat, an elongated tube containing mercury coaxially mounted within said seat, a generally cylindrical piston slidably received within said tube and having a circumferential groove, and an elastic ring fitted within said groove, a portion of said piston being flattened to form a longitudinal air-leakage channel, an electrical switch mounted above said seat and including a pivoted armature, a rod having one end abutting said piston and the other end thereof engaging said armature to transmit the movement of said piston thereto, a movable contact secured to one end of said armature, a fixed contact disposed in co-acting relation to said movable contact, and a spring to be coupled to said armature to urge said movable contact into engagement with said fixed contact.

12. In an electrical water-heating apparatus, a heater assembly comprising a cylindrical casing, first and second insulating disc enclosing the ends of said casing to form a heating chamber, said first disc having a central bore providing a water outlet from said chamber, a cylindrical rotor electrode disposed within said chamber and having an axial bore in alignment with said inlet, a plurality of stator sections surrounding said rotor electrode, a grounding plate interposed between said first disc and said rotor electrode and having a central opening in alignment with said outlet, and a thermostat including a hollow seat supported on said first disc and having a projection extending into said outlet, and a mercury-filled tube concentrically supported within said seat and extending through said opening in said grounding-plate into the axial bore in said rotor electrode.

13. In an electrical water-heating apparatus a heater assembly comprising a cylindrical casing, first and second insulating discs enclosing the ends of said casing to form a heating chamber, said first disc having a bore providing a water outlet from said chamber, a cylindrical rotor electrode disposed within said chamber and having an axial bore in alignment with said outlet, a plurality of stator sections surrounding said rotor electrode, a grounding-plate interposed between said first disc and said rotor electrode and having a central opening in alignment with said outlet, a thermostat including a hollow seat supported on said first disc and having a projection extending into said outlet therein, a mercury-filled tube concentrically supported within said seat and extending through said opening in said grounding-plate into said axial bore in said rotor electrode, said seat being provided with an inlet communicating with the interior thereof whereby water may flow into said heating chamber through the annular passage between said tube and said seat, a spigot coupled to said chamber through the outlet in said first disc, means to connect a voltage supply between said rotor electrode and said stator sections, and means interposing said switch between some of said stator sections and said voltage supply.

References Cited in the file of this patent

UNITED STATES PATENTS

| 1,162,469 | Fox | Nov. 30, 1915 |
| 1,920,284 | Wells | Aug. 1, 1933 |
| 2,380,132 | Walther | July 10, 1945 |
| 2,599,806 | Benchemoul | June 10, 1952 |
| 2,605,381 | Head | July 29, 1952 |